July 1, 1952  B. A. YATES  2,601,842
CHIME WHISTLE
Filed June 13, 1950  2 SHEETS—SHEET 1
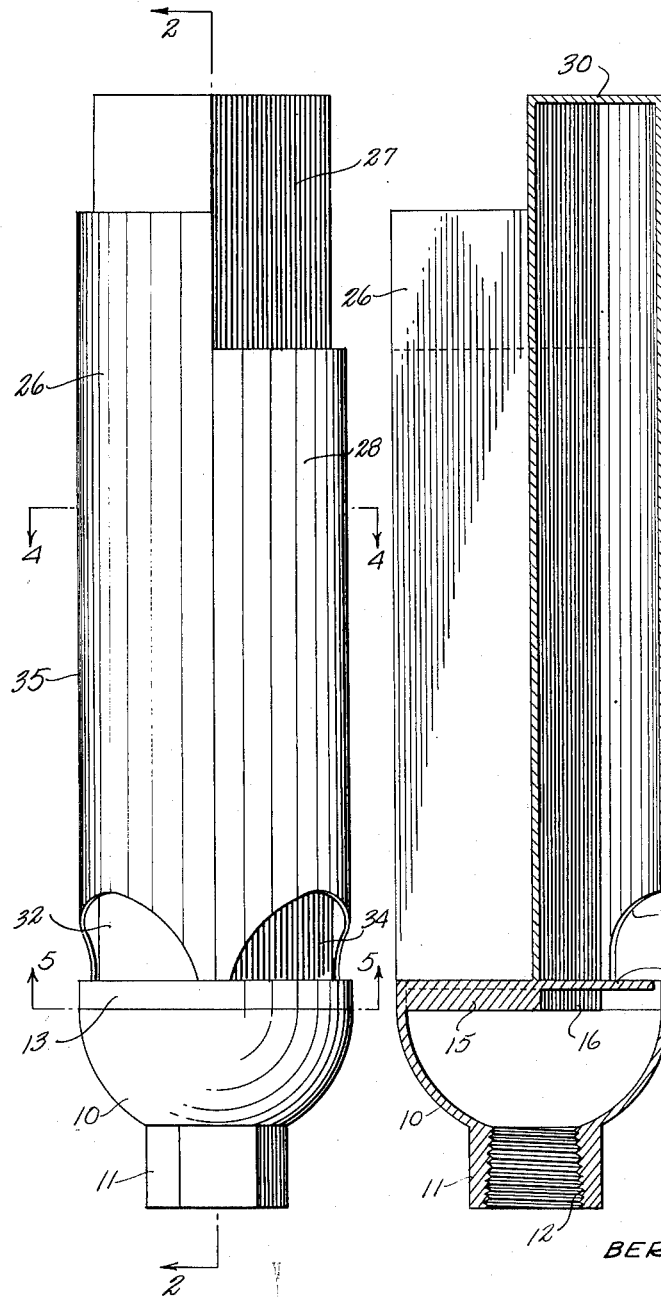
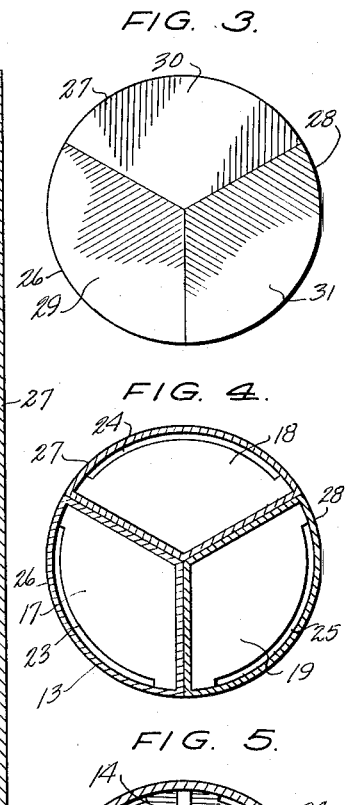
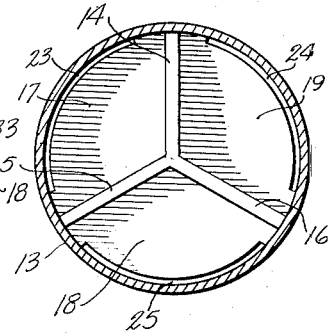
INVENTOR.
BERNIE A. YATES,
BY
McMorrow, Berman + Davidson
ATTORNEYS.

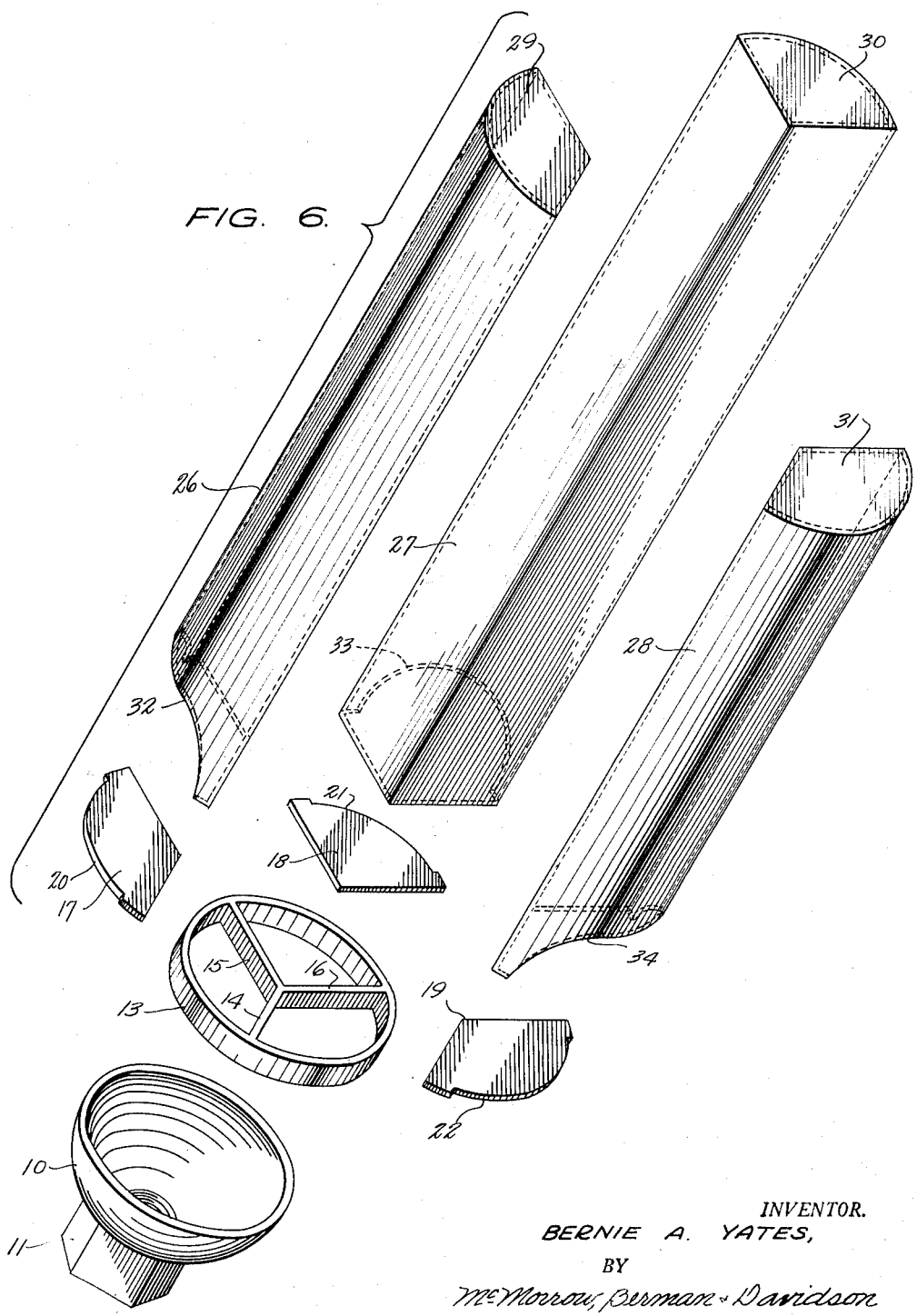

Patented July 1, 1952

2,601,842

UNITED STATES PATENT OFFICE 2,601,842

CHIME WHISTLE

Bernie A. Yates, Herington, Kans.

Application June 13, 1950, Serial No. 167,724

1 Claim. (Cl. 116—141)

This invention relates to chime whistles and more particularly to a whistle especially designed for operation by compressed air at pressures such as are usually provided in Diesel engine locomotives and similar vehicles.

It is among the objects of the invention to provide an improved chime whistle which can be conveniently mounted on a compressed air conduit and may, if desired, replace the compressed air operated horns usually provided on Diesel engine locomotives, which has a tone, volume and carrying capacity similar to steam operated locomotive whistles, which operates on a very small quantity of compressed air in comparison to the amount of compressed air that would be required to operate an ordinary steam whistle assembly of equivalent capacity, which is of unitary construction avoiding the use of any central core or stem and has its base or bowl directly and permanently connected to its bell or chime portion, and which is simple and durable in construction, economical to manufacture, and neat and attractive in appearance.

Other objects and advantages will become apparent from a consideration of the following description and the appended claim in conjunction with the accompanying drawings wherein:

Figure 1 is a side elevational view of a chime whistle illustrative of the invention;

Figure 2 is a longitudinal cross sectional view on the line 2—2 of Figure 1;

Figure 3 is a top plan view of the whistle;

Figure 4 is a transverse cross sectional view on the line 4—4 of Figure 1;

Figure 5 is a transverse cross sectional view on the line 5—5 of Figure 1; and

Figure 6 is an exploded perspective view of the component parts of the whistle.

With continued reference to the drawings, the whistle comprises a bowl 10 of substantially semi-circular shape having a small wall thickness in proportion to its diameter and having a hollow boss 11 projecting from the center of its convex side and provided with internal screw threads 12 for the reception of the screw threaded end of a compressed air conduit or whistle valve. The outside of the boss 11 is polygonal in form and provided with adjoining flat faces for engagement by a wrench to firmly thread the bowl onto a whistle supporting structure.

A flat cylindrical ring 13 of substantially the same diameter as the open end of the bowl 10 is disposed with one edge in contact with the rim of the bowl and is firmly secured to the bowl by suitable means, such as welding or brazing. Flat webs 14, 15 and 16 of substantially the same width as the width of the ring 13 project radially from the center of the ring to the inner surface of the latter and are spaced apart at angular intervals of approximately 120 degrees.

Three flat, sector shaped plates 17, 18 and 19 are so disposed that each plate is positioned between two adjacent ribs within the ring 13 with the radial edges of the plates extending along the ribs at the sides of the latter remote from the bowl 10. With this arrangement, the plates 17, 18 and 19 together with the ribs 14, 15 and 16 constitute a disc which closes the end of the ring 13 remote from the bowl 10 and the outer surface of which is substantially flush with the corresponding edge of the ring 13.

The sector shaped plate 17 is provided in its arcuate or circumferential surface with an elongated recess 20 which extends longitudinally of the circumferential edge of the plate for the major portion of the length of such edge and has its ends spaced substantially equal distances from the corners of the plate at which the arcuate edge joins the radial edges thereof. The recess 20 is shallow in proportion to the length of the radial edges of the plate 17 and the plates 18 and 19 are provided with similar recesses 21 and 22 respectively.

When the bowl, the ring and the plates are assembled in the manner indicated above, the recesses 20, 21 and 22 provide three elongated arcuate slots 23, 24 and 25 located between the outer edges of the corresponding plates and the adjacent inner surface of the ring 13 and positioned each between two adjacent ribs 14, 15 and 16.

The total area of the three slots 23, 24 and 25 is such as to restrict the quantity of compressed air which can pass therethrough to an amount substantially less than the capacity of the air compressor in a Diesel engine locomotive so that operation of the whistle does not materially decrease the pressure of the air in the compressed air reservoir of such a vehicle.

Three elongated hollow bodies 26, 27 and 28 of sector shaped cross section are secured together along their flat sides to provide a generally cylindrical bell unit having a diameter substantially the same as the diameter of the ring 13. The bodies 26, 27 and 28 have thin walls in proportion to the width of their flat sides and are secured together so that their ends at one end of the bell are substantially flush.

The assembly provided by the three bodies 26, 27 and 28 is disposed with its flush end on the closed side of the ring 13 and with the flat sides of the bodies constituting the assembly extending along the corresponding ribs 14, 15 and 16. The ends of the flat sides of these bodies are permanently and rigidly secured to the ribs 14, 15 and 16 and to the adjacent edges of the plates 17, 18 and 19 so that the corners of the bodies are substantially perpendicular to the end surfaces of the ring.

The three bodies 26, 27 and 28 are of different lengths and are closed at their ends remote from the ring 13 by sector shaped plates 29, 30 and 31 respectively. The length of the three hollow bodies is carefully proportioned relative to their effective diameter so that each body, when sounded, will produce a substantially pure musical note and so that the musical notes produced by the three bodies will constitute a major musical chord.

At their ends adjacent the ring 13 the three bodies are provided in their partly cylindrical or curved sides with substantially semicircular openings 32, 33 and 34 respectively, the width of these openings being substantially the same as the length of the three corresponding slots 23, 24 and 25 and being in registry with these slots.

The several component parts of the whistle are formed of a suitable material, such as brass or other corrosion resisting metal alloy and are permanently secured together by suitable means, such as welding or brazing, to provide a unitary structure.

The ring 13 reinforced by the radial ribs 14, 15 and 16, together with the sector shaped plates 17, 18 and 19 constitute a strong and rigid connection between the bowl 10 and the bell 35 of the whistle so that no central core or stem is needed to secure the bell to the bowl and the efficiency of the whistle is thus increased while its weight and manufacturing cost is greatly reduced. This rigid structure including the slots 23, 24 and 25 is also effective to direct the compressed air into the hollow bodies constituting the bell of the whistle with the maximum sound producing efficiency to maintain the compressed air requirements of the whistle at a minimum for the volume of sound produced.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claim are, therefore, intended to be embraced therein.

What is claimed is:

A chime whistle comprising a bowl of substantially hemispherical shape having a hollow and internally screw threaded boss projecting from substantially the center of the convex side thereof, a flat ring secured at one edge to the edge of said bowl, ribs in said ring extending from the center to the inner surface of said ring a substantially equal angular intervals, sector shaped plates disposed one between each two adjacent ribs substantially flush with the side of said ring remote from said bowl, each of said plates having a marginal recess providing an elongated arcuate slot extending along the inner surface of said ring between the corresponding ribs, and three elongated hollow bodies of sector shaped cross section secured together to provide a generally cylindrical bell, said bodies having open ends substantially flush at one end of said bell and having their other ends closed and said bell being secured at said one end to said ring and said ribs at the side of said ring remote from said bowl with each of said hollow bodies in registry with a corresponding one of said plates, each of said hollow bodies having in the ring adjacent end of its outer side an opening substantially coextensive with the adjacent slot.

BERNIE A. YATES.

REFERENCES CITED

The following references are of record in the file of this patent:

UNITED STATES PATENTS

| Number | Name | Date |
| --- | --- | --- |
| 856,001 | Stump et al. | June 4, 1907 |
| 906,332 | Stump | Dec. 8, 1908 |
| 1,327,323 | Hall | Jan. 6, 1920 |
| 1,436,876 | Hall | Nov. 28, 1922 |
| 1,519,839 | Huffman | Dec. 16, 1924 |